(12) United States Patent
Nonaka

(10) Patent No.: US 8,755,075 B2
(45) Date of Patent: Jun. 17, 2014

(54) CONTROL APPARATUS, CONTROL METHOD, AND STORAGE MEDIUM

(75) Inventor: Takashi Nonaka, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/555,900

(22) Filed: Jul. 23, 2012

(65) Prior Publication Data

US 2013/0033724 A1  Feb. 7, 2013

(30) Foreign Application Priority Data

Aug. 2, 2011  (JP) ................................. 2011-169371

(51) Int. Cl.
*G06K 15/02*  (2006.01)

(52) U.S. Cl.
USPC ........ 358/1.15; 709/225; 358/1.16; 358/1.13; 358/1.12; 399/43

(58) Field of Classification Search
None
See application file for complete search history.

(56) References Cited

U.S. PATENT DOCUMENTS

| | | | |
|---|---|---|---|
| 6,202,092 B1 * | 3/2001 | Takimoto | 709/225 |
| 6,396,594 B1 * | 5/2002 | French et al. | 358/1.18 |
| 7,394,558 B2 * | 7/2008 | Stringham | 358/1.15 |
| 7,426,352 B2 * | 9/2008 | Moriyama et al. | 399/43 |
| 7,576,875 B2 * | 8/2009 | Momose | 358/1.13 |
| 7,626,738 B2 * | 12/2009 | Yamada | 358/504 |
| 7,710,596 B2 * | 5/2010 | Shibao | 358/1.9 |
| 8,259,333 B2 * | 9/2012 | Nakagawa | 358/1.15 |
| 8,451,479 B2 * | 5/2013 | Nishiyama et al. | 358/1.15 |
| 8,488,177 B2 * | 7/2013 | Yamada | 358/1.16 |

FOREIGN PATENT DOCUMENTS

JP  4497543 B2  7/2010

* cited by examiner

*Primary Examiner* — Ashish K Thomas
(74) *Attorney, Agent, or Firm* — Canon USA, Inc., IP Division

(57) ABSTRACT

A control apparatus, which controls a processing apparatus for processing recording media and includes a storage unit configured to store medium number information indicating a number of recording media processable altogether by the processing apparatus, includes a counting unit and a control unit. The counting unit counts a number of recording media processed by the processing apparatus for each processing. The control unit determines whether the counted number of recording media reaches the number indicated by the medium number information. In response to determining that the number of the recording media counted by the counting unit reaches the number indicated by the medium number information, the control unit changes the medium number information stored in the storage unit to expanded medium number information indicating a number of recording media larger than the number indicated by the stored medium number information and processable altogether by the processing apparatus.

12 Claims, 17 Drawing Sheets

CONTROL APPARATUS, CONTROL METHOD, AND STORAGE MEDIUM

BACKGROUND OF THE INVENTION

1. Field of the Invention

The present invention relates to a control apparatus, a control method, and a storage medium.

2. Description of the Related Art

In a printing market, there is a demand for an image forming apparatus that forms images corresponding to various types of sheets, and a post-processing apparatus that executes post-processing for a sheet on which an image has been formed. The image forming apparatus should be able to form optimal images on sheets having various characteristics in basic weight (weight), shape, and surface texture, such as plain paper, recycled paper, thin paper, color paper, thick paper, coated paper, bond paper, an overhead projector (OHP) sheet, label paper, a postcard, tab paper, and punched paper.

The post-processing apparatus should be able to post-process a bundle of sheets (sheet bundle) on which images have been formed into various products. As the post-processing, there are stapling, saddle stitch binding processing, and case binding processing. In the post-processing, processing is executed for the sheet bundle, and thus a difference in sheet type greatly affects the number of post-processable sheets.

For example, even a stapler, which can staple the stack of 150 sheets in the case of plain paper, may be allowed to staple the stack of sheets only up to 100 in the case of thick paper. To deal with this problem, there has been developed a method that limits stapling on the number of staplable sheets for all types of sheets, which the operations of the image forming apparatus and the post-processing device are guaranteed.

By this method, operations can surely be performed for all types of sheets, and a situation where stapling is executed for a sheet bundle exceeding stapler performance to cause a stapling failure can be prevented. However, the method uniformly limits the numbers of sheets for all the sheets. As a result, the limits are too excessive for the types of sheets (e.g., thin paper) originally permitting stapling of a greater number of sheets.

There is a method that, rather than uniformly limiting the numbers of post-processable sheets for all the sheets, can set the number of sheets. In a mode that permits only a service engineer to make adjustment (service mode), the number of post-processable sheets can be adjusted/set for each type of a sheet.

For example, there is provided a service mode where the numbers of sheets to be limited are set according to sizes of sheets so that stapling is permitted up to 100 in the case of a sheet smaller than a fixed size such as A4 or LTR, and up to 50 in the case of sheets of larger sizes. In this service mode, the service engineer adjusts the numbers of sheets when necessary.

Further, for example, there is provided a service mode where the numbers of sheets to be limited are set according to types of sheets so that case binding (glue binding) is permitted up to 200 in the case of thin paper or plain paper, and up to 10 in the case of thick paper (thick paper 1 to thick paper 6). In this service mode, the service engineer widens the limits only for necessary types of sheets as needed.

The operations are enabled by adjustment carried out by the service engineer. In some cases, the service engineer carries out adjustment based on user's prior agreement that restrictions may be imposed. The restrictions may be reduction of stapling accuracy and an increase of an occurrence rate of jamming during stapling.

However, in a Print On Demand (POD) market, there are many cases where the number of products barely exceeding an upper limit are to be produced. Therefore, in the case of the products, the products are finally inspected to check finishing. Thus, in the post-processing, there is a strong demand for removing limits imposed on the numbers of sheets.

Thus, the measures based on the service mode have been acceptable in the POD market. However, from the standpoint of service costs, when there is a request from the user, service engineer's visit becomes necessary, thus generating maintenance costs.

Japanese Patent No. 4497543 discusses a method that does not require service engineer's visit but provides a screen to enable the user to set the number of sheets. The method provides the screen so that inhibited post-processing can be executed on recording paper, or the number of limited sheets can be changed to a larger value, and the user can expand operations by presetting via the screen.

According to the method discussed in Japanese Patent No. 4497543, the user can freely input a setting value relating to the fine number of sheets for each sheet (recording medium) without service engineer's visit. Thus, there are no service maintenance costs. However, when a job of the number of sheets exceeding the user's setting value is input, control is performed not to execute any post-processing. As a result, to acquire an output intended by the user, time and labor is expended to change the setting value relating to the number of sheets according to the job.

SUMMARY OF THE INVENTION

The present invention is directed to a control apparatus capable of performing more appropriate control of processing on a recording medium, and a control method.

According to an aspect of the present invention, a control apparatus, that controls a processing apparatus for processing recording media and includes a storage unit configured to store medium number information indicating a number of recording media processable altogether by the processing apparatus, includes a counting unit configured to count a number of recording media processed by the processing apparatus for each processing, and a control unit configured to determine whether the number of recording media counted by the counting unit reaches the number indicated by the medium number information, and to change, in response to determining that the number of the recording media counted by the counting unit reaches the number indicated by the medium number information, the medium number information stored in the storage unit to expanded medium number information indicating a number of recording media larger than the number indicated by the stored medium number information and processable altogether by the processing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

The exemplary embodiments are in no way limitative of the present invention, nor all components described in the exemplary embodiments are essential to solution of the problems.

The present exemplary embodiment relates to a technology of controlling a post-processing apparatus to execute post-processing under various conditions as much as possible. More specifically, the exemplary embodiment relates to control for automatically or selectively increasing the number of sheets to be processable altogether to an operable range when the number of sheets for executing post-processing of an input job exceeds a guaranteed operation range, and displaying the expansion of the post-processing operation range on a display unit.

Figure 1A:
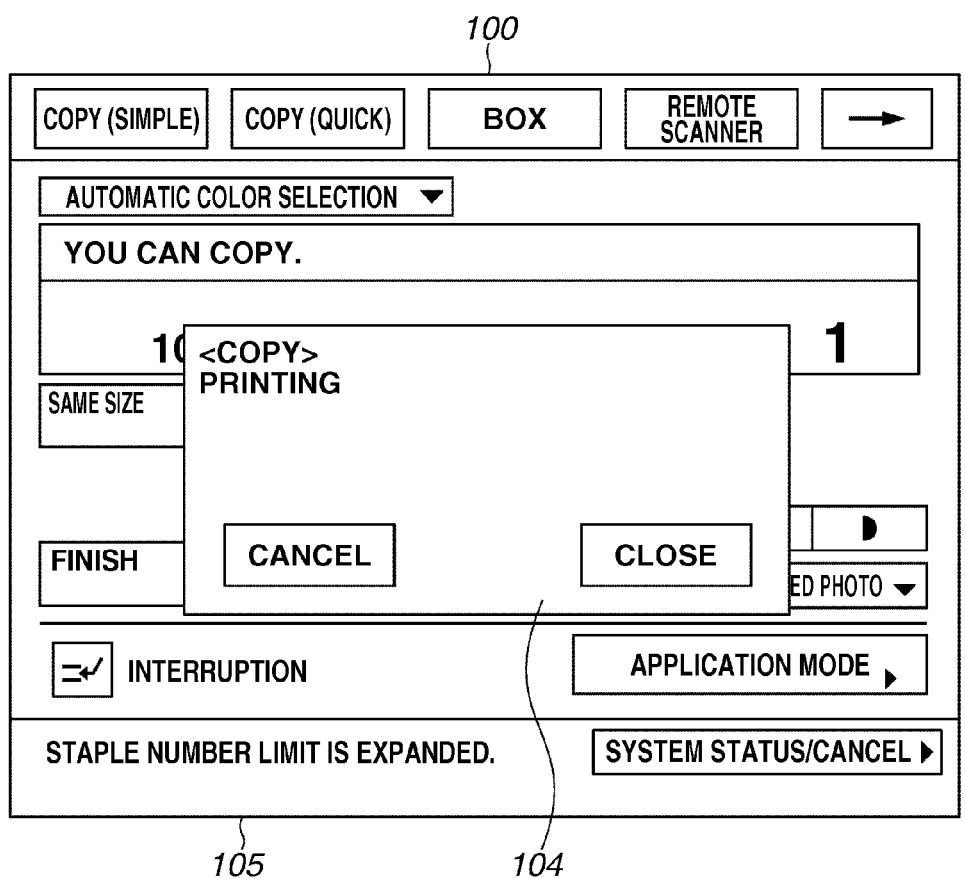
FIGS. 1A and 1B illustrate examples of user interfaces (UI).
Figure 1B:
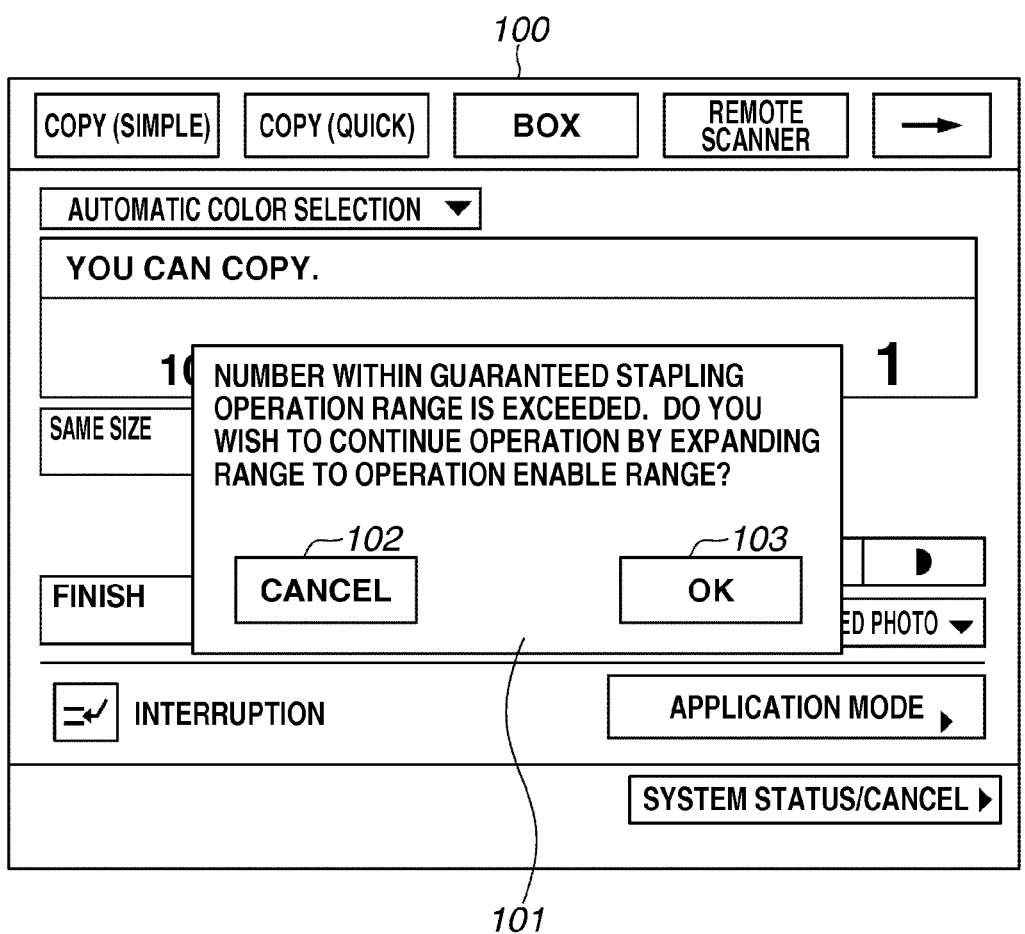

An outline of this exemplary embodiment is described referring to FIGS. 1A and 1B. Each of FIGS. 1A and 1B illustrates an example of a UI (basic screen 100) displayed on an operation panel of a multifunction peripheral (MFP) according to the present exemplary embodiment.

On the basic screen 100 illustrated in FIG. 1A, since a copying (printing) job is being executed, a pop-up 104 is displayed during the execution to indicate ongoing printing. In the pop-up 104, there are displayed a cancel button for canceling the printing and a close button for closing the pop-up 104 to input a next job.

FIG. 1A illustrated that the currently executed job is a job where stapling is instructed, and that the number of pages exceeds the number of sheets where post-processing is guaranteed (post-processing guaranteed number) i.e., in an expanded state. As described below, the post-processing guaranteed number is expanded to the number of post-processable sheets (post-processable number that is an example of medium number information indicating the number of recording media processable altogether).

While the printing continues, a status line 105 displays a message "STAPLE NUMBER LIMIT IS EXPANDED" indicating the expanded state.

Upon the input of the job where stapling exceeding the post-processing guaranteed number is instructed, in a case of a state where the post-processing guaranteed number has not been expanded (normal state), stapling is ignored in a conventional operation. However, in the operation of the present exemplary embodiment, stapling may be executed. A difference between the conventional operation and the operation of the present exemplary embodiment is described below referring to FIGS. 8A to 8C.

On the basic screen 100 illustrated in FIG. 1B, a pop-up 101 is displayed, which prompts the user to select, after the post-processing guaranteed number has been reached to temporarily stop the job, continuance of the operation or expansion of the post-processing guaranteed number.

The pop-up 101 indicates that an upper limit number (post-processing guaranteed number) of a range where an operation is guaranteed in stapling (guaranteed operation range) is exceeded. In the pop-up 101, a cancel button 102 and an OK button 103 for receiving expansion or non-expansion of the number (post-processable number) of a range where an operation is permitted (operable range) are displayed. The user is prompted to select one of the buttons.

When wishing to continue the operation, the user selects the cancel button 102. When the cancel button 102 is selected, no expansion is made to the post-processable number, and thus the instruction of the stapling is invalidated to continue the job. On the other hand, when wishing to expand the number to the post-processable number, the user selects the OK button 103. When the OK button 103 is selected, the processing changes to the screen illustrated in FIG. 1A, and the limit on the number to be post-processed is expanded to continue the operation. The status line 105 displays above-described message.

Figure 2:
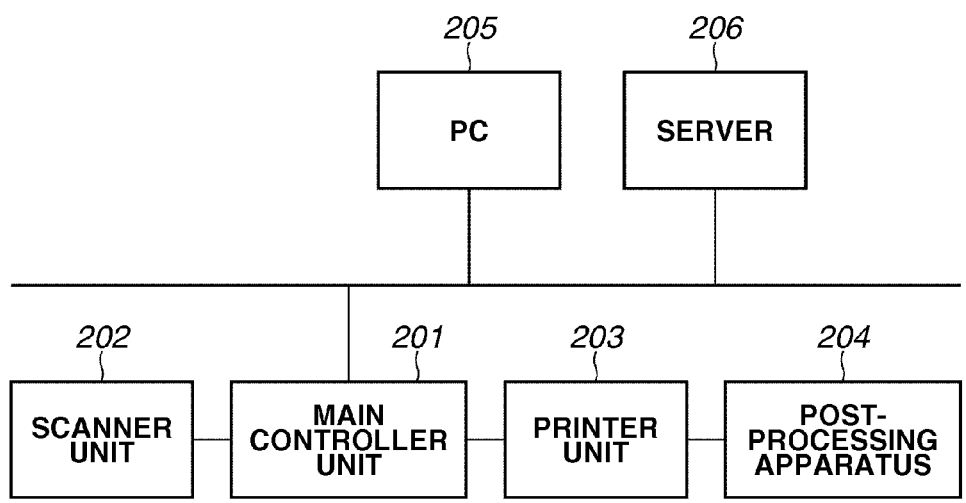
FIG. 2 illustrates an example of a system configuration.

Next, referring to FIG. 2, the entire system including an image forming apparatus and a post-processing apparatus is described. FIG. 2 illustrates an example of a configuration of the system. Hereinafter, it is assumed that the MFP includes an image forming apparatus including a main controller unit 201 for controlling the entire MFP, a scanner unit 202 for reading documents, and a printer unit 203 for forming images, and a post-processing apparatus 204.

The main controller unit 201 is an example of a control apparatus (computer). The post-processing apparatus 204, which is an example of a processing apparatus (computer) for processing a recording medium, is connected to the printer unit 203 and to the main controller unit 201 via the printer unit 203.

The MFP is connected to a personal computer (PC) 205 and a server 206 via a network. The PC 205, which is an example of an information processing apparatus (computer), gives instructions as to printing from each application software to the MFP by utilizing a printer driver installed in the PC 205.

The server 206, which is an example of an information processing apparatus (computer), has a device management function for managing a state of the MFP. The server 206 further manages information regarding states of the scanner unit 202, the printer unit 203, and the post-processing apparatus (finisher unit) 204 notified from the main controller unit 201.

The present exemplary embodiment is not limited to the aforementioned configuration. For example, a configuration where the post-processing apparatus 204 is connected to the main controller unit 201 via the network may be employed.

Figure 3:
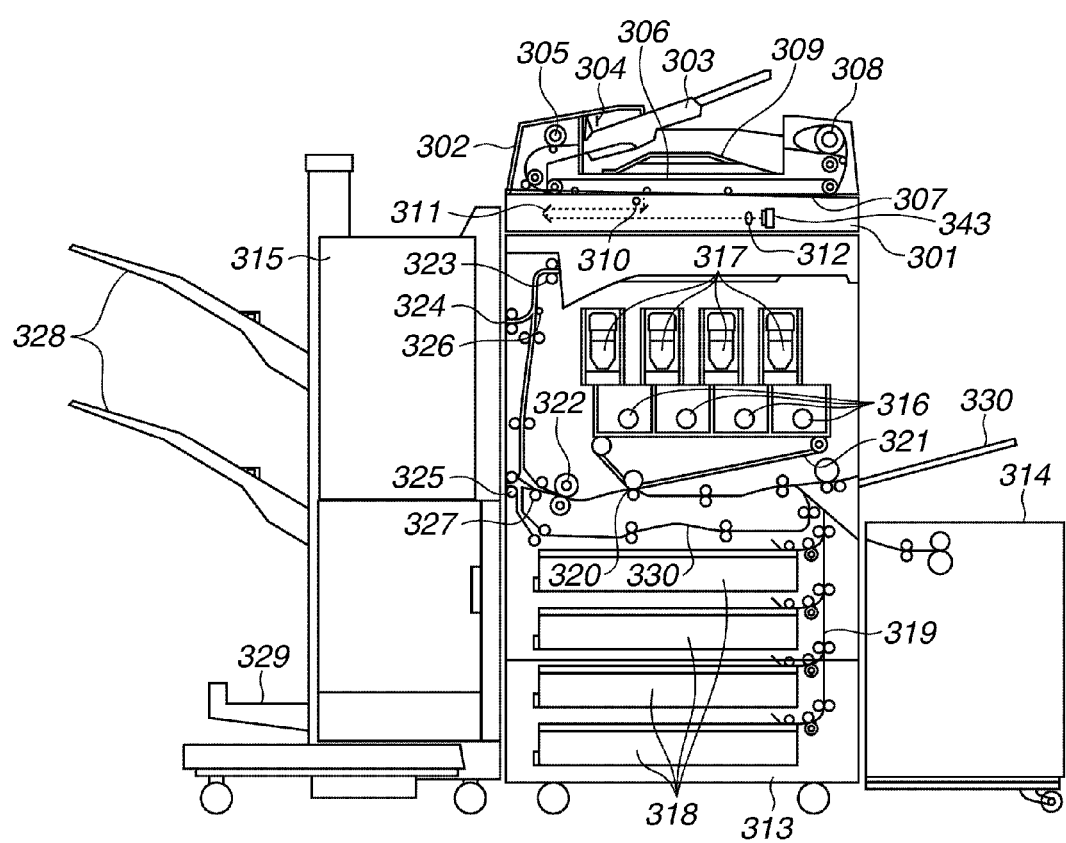
FIG. 3 illustrates an example of a configuration of a multifunction peripheral (MFP).

Next, referring to FIG. 3, a configuration of the MFP is described. FIG. 3 illustrates an example of the configuration of the MFP. The MFP has copy, printer, and facsimile functions.

The MFP includes a scanner 301, a document feeder (DF) 302, a print engine 313 including four color drums for print recording, a sheet feeding deck 314, and a finisher 315. The scanner 301 and the DF 302 constitute the scanner unit 202.

The print engine 313 constitutes the printer unit 203. The finisher 315 constitutes the post-processing apparatus 204.

First, a scanner operation mainly carried out by the scanner 301 is described. When a document is set on a platen 307 to read data, the user sets the document on the platen 307 and closes the DF 302. Then, after an open/close sensor detects the closing of the platen 307, a reflection type document size detection sensor located in a case of the scanner 301 detects a size of the set document.

In response to the detection of the size, the document is irradiated with light from a light source 310, and a charge-coupled device (CCD) 343 reads an image via a reflection plate 31 and a lens 302. Then, the image is converted into a digital signal, and subjected to desired image processing to be converted into a laser recording signal. The converted recording signal is stored in a memory of a controller described below referring to FIG. 4.

When a document is set on the DF 302 to read data, the user sets the document face-up on a tray of a document setting unit 303 of the DF 302. Then, a document presence sensor 304 detects the setting of the document. In response to the detection, a sheet feeding roller 305 and a conveyance belt 306 rotate to convey the document, and the document is set in a predetermined position on the platen 307. Thereafter, as in the case of reading a document on the platen 307, the image is read to be converted into a recording signal, and stored in the memory of the controller.

After completion of the reading, the conveyance belt 306 rotates again to feed the document to the right side in FIG. 3, and the document is discharged to a document discharge tray 309 via a conveyance roller 308 of a discharge side. When there is a plurality of documents, a document is discharged and conveyed to the right side in FIG. 3 from the platen 307, simultaneously a next document is fed from the left side via the sheet feeding roller 305, and the next document is continuously read. Thus, the scanning operation is performed.

Figure 4:
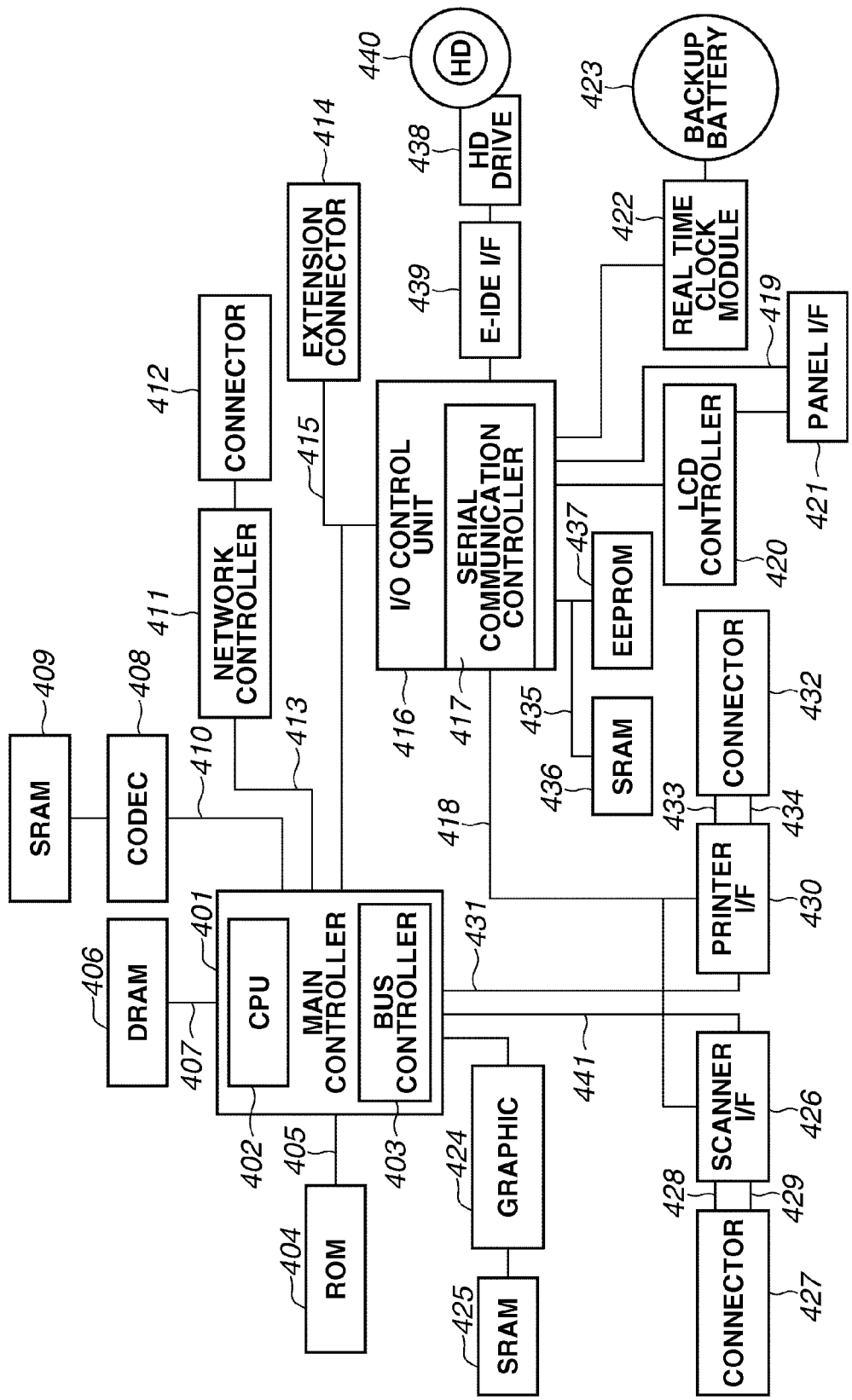
FIG. 4 illustrates an example of a hardware configuration of a main controller.

Next, a printing operation mainly carried out by the print engine 313 is described. The recording signal (print image data) once stored in the memory of the controller illustrated in FIG. 4 is transferred to the print engine 313, and converted into recording laser beams for four colors, namely, yellow, magenta, cyan, and black, by a laser recording unit. A photosensitive member 316 of each color is irradiated with the laser beam to form an electrostatic latent image thereon. Then, the electrostatic latent image is developed by toner supplied from a toner cartridge 317 to be made visible, and primarily transferred to an intermediate transfer belt 321.

Then, the intermediate transfer belt 321 is rotated clockwise. When a sheet (recording sheet) fed from a sheet cassette 318 or the sheet feeding deck 314 through a fed sheet conveyance path 319 comes to a secondary transfer position 320, the image is transferred from the intermediate transfer belt 321 to the sheet.

A fixing device 322 fixes toner on the sheet to which the image has been transferred by pressure and heat. The sheet is then conveyed through the discharge conveyance path to be discharged to a face-down center tray 323, or switched back to a discharge port 324 to the finisher or a face-up side tray 325. However, the side tray 325 is a discharge port that allows discharging only when the finisher 315 is not attached.

A flapper 326 and a flapper 327 switch the conveyance paths to change such discharge ports. In a case of two-sided printing, after passing through the fixing device 322, the flapper 327 switches the conveyance path. Then, the sheet is switched back to be sent downward, and fed again to the secondary transfer position 320 through a two-sided printing sheet conveyance path 330. Accordingly, a double-sided printing operation is achieved.

Two-sided circulation control is carried out by using the components in the conveyance path including the two-sided printing conveyance path 330, the secondary transfer position 320, and the fixing device 322. Five-sheet circulation control is executed for the A4 size and the LTR size, and three-sheet circulation control is executed for sheets of larger sizes.

Next, a finisher operation mainly carried out by the finisher 315 is described. The finisher 315 applies post-processing to a printed sheet according to a setting value designated by the user. More specifically, a setting value is designated for stapling (1 or 2 place stapling), punching (2 or 3 holes), or saddle stitch binding.

The MFP includes two discharge trays 328. For the sheets having passed through the discharge port 324 to the finisher 315, according to the setting value designated by the user, for example, the discharge tray is assigned for each copy, printer, or facsimile function.

When the MFP is used as a printer, via the printer driver, various setting values can be designated for black and white printing/color printing, a sheet size, 2 UP/4 UP printing/N-UP printing, two-sided, stapling, punching, saddle stitch binding, an inserted sheet, a front cover, and a back cover.

Next, referring to FIG. 4, the configuration of the main controller unit 201 of the image forming apparatus is described. FIG. 4 illustrates an example of a hardware configuration of the main controller unit 201.

A main controller 401 mainly includes a central processing unit (CPU) 402, a bus controller 403, and various interface (I/F) controller circuits.

The CPU 402 and the bus controller 403 control an overall operation of the MFP. The CPU 402 is operated based on a program read from a read-only memory (ROM) 404 via a ROM I/F 405. A processing content for interpreting page description language (PDL) code data received from the PC 205 and rasterizing it into raster image data is also described in this program, and realized by executing the program by the CPU 402 (by software).

The bus controller 403, which controls transfer of data input/output from each I/F, controls arbitration at the time of bus competition or direct memory access (DMA) data transfer.

A dynamic random access memory (DRAM) 406, which is connected to the main controller 401 via a DRAM I/F 407, is used as a work area for operating the CPU 402 or an area for storing image data.

A codec 408 compresses the raster image data stored in the DRAM 406 by a Modified Huffman (MH), Modified READ (MR), Modified Modified READ (MMR), Joint Bi-level Image Experts Group (JBIG), or Joint Photographic Experts Group (JPEG) method, and decompresses compressed and stored code data into raster image data. A static RAM (SRAM) 409 is used as a temporary work area of the codec 408. The codex 408 is connected to the main controller 401 via an I/F 410. Data transfer between the codec 408 and the DRAM 406 is controlled by the bus controller 403, and data is DMA-transferred.

A graphic processor 424 carries out image rotation, image magnification, color spatial conversion, ad binarization on the raster image stored in the DRAM 406. An SRAM 425 is used as a temporary work area of the graphic processor 424. The graphic processor 424 is connected to the main controller 401 via an I/F. Data transfer between the graphic processor 424 and the DRAM 406 is controlled by the bus controller 403, and data is DMA-transferred.

A network controller 411 is connected to the main controller 401 via an I/F 413, and connected to an external network via a connector 412. As a network, a general local area network (LAN) can be used.

An extension connector 414 for connecting an extension board and an input/output (I/O) control unit 416 are connected to a general-purpose high-speed bus 415. For the general-purpose high-speed bus 415, a general peripheral components interconnect (PCI) bus can be used. The I/O control unit 416 includes two channels of start-stop synchronous communication serial communication controllers 417 for transmitting/receiving a control command with each CPU of the scanner unit 201 and printer unit 203. The start-stop synchronous communication serial communication controller 417 is connected to a scanner I/F 426 (scanner I/F circuit) and a printer I/F 430 (printer I/F circuit) via an I/O bus 418.

A panel I/F 421, which is connected to a liquid crystal display (LCD) controller 420, includes an I/F for displaying on a liquid crystal screen on an operation unit 501 described below, and a key input I/F for inputting from a hard key or a touch panel key.

The operation unit 501 described below includes a liquid crystal display unit, a touch panel input device attached on the liquid crystal display unit, and a plurality of hard keys.

A signal input by the touch panel input device or the hard key (an example input device) is transmitted to the CPU 402 via the panel I/F 421, and the liquid crystal display unit displays image data transmitted from the panel I/F 421. On the liquid crystal display unit, a display relating to a function of the operation of the MFP, and image date are displayed.

A real time clock module 422 configured to update and store a date and time managed in the MFP is backed up by a backup battery 423.

An enhanced integrated drive electronics (E-IDE) interface 439 is for connecting an external storage device. In the present exemplary embodiment, a hard disk drive 438 is connected via the E-IDE interface 439, the image data is stored in a hard disk (HD) 440, and the image data is read from the HD 440.

A connector 427 and a connector 432, which are respectively connected to the scanner unit 202 and the printer unit 203, includes same start-stop synchronous communication serial I/Fs (428 and 433) and video I/Fs (429 and 434).

The scanner I/F 426, which is connected to the scanner unit 202 via the connector 427 and to the main controller 401 via a scanner bus 441, has a function of executing predetermined processing for an image received from the scanner unit 202. Further, the scanner I/F 426 has a function of outputting a control signal generated based on a video control signal transmitted from the scanner unit 202 to the scanner bus 429. Data transfer from the scanner bus 429 to the DRAM 406 is controlled by the bus controller 403.

The printer I/F 430 is connected to the printer unit 203 via the connector 432 and to the main controller 401 via a printer bus 431. The printer I/F 430 has a function of executing predetermined processing for image data output from the main controller 401, and outputting it to the printer unit 203. Further, the printer I/F 430 has a function of outputting a control signal generated based on a video control signal transmitted from the printer unit 203 to the printer bus 431.

The transfer of the raster image data rasterized on the DRAM 406 to the printer unit 203 is controlled by the bus controller 403. The raster image data is DMA-transferred to the printer unit 203 via the printer bus 432 and a video I/F 434.

A SRAM 436 is a memory configured to keep stored contents by power supplied from the backup battery 423 even when power to the entire MFP is cut off, and connected to the I/O control unit 416 via a bus 435. Similarly, an electrically erasable programmable read-only memory (EEPROM) 437 is a memory connected to the I/O control unit 416 via the bus 435.

Figure 5:
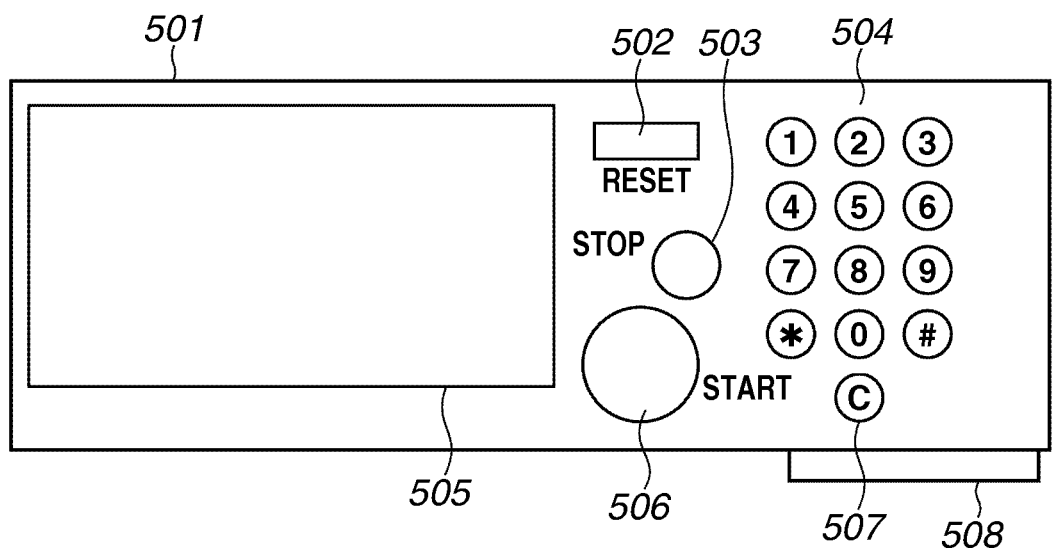
FIG. 5 illustrates an example of a UI.

Next, the UI for receiving various input setting values is described. FIG. 5 illustrates an example (operation unit 501) of the UI. The operation unit 501 is connected beyond the panel I/F 421. For example, the user inputs various setting values via an operation (user's operation) to the operation unit 501.

A reset key 502 is a UI for canceling a setting value designated (input) by the user. A stop key 503 is a UI used for canceling an ongoing job. A numerical keypad 504 is a UI for inputting a numerical value such as an entry.

Figure 6:
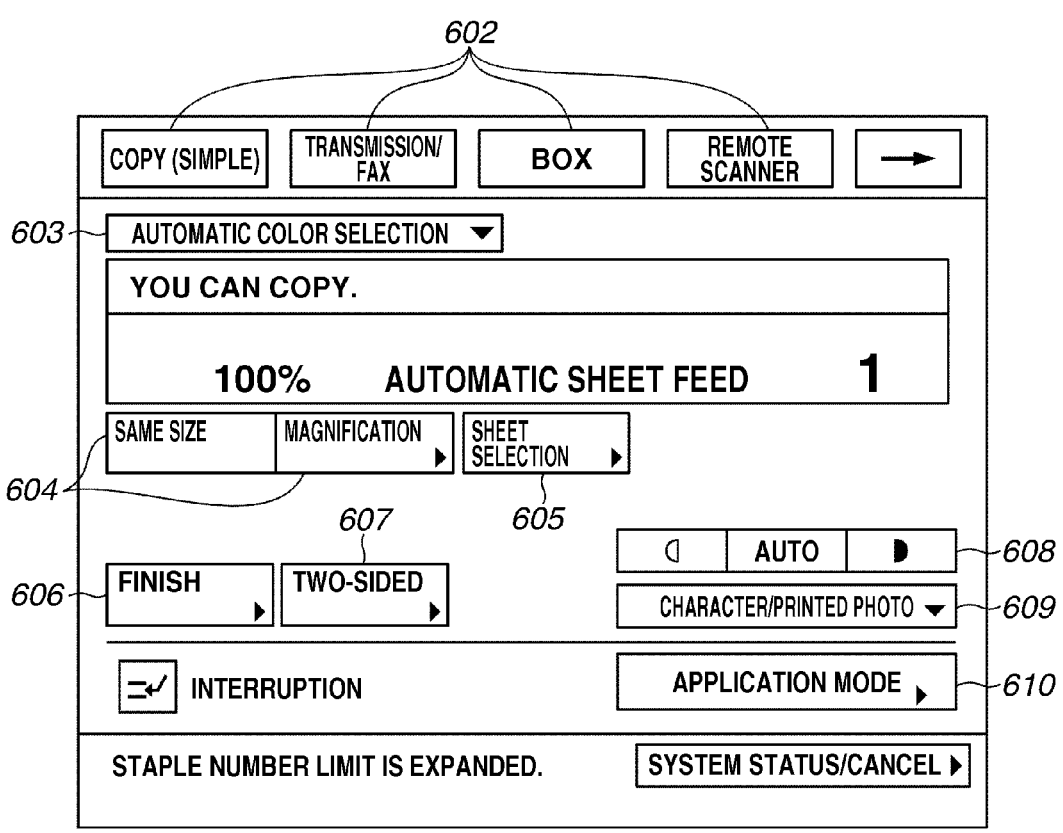
FIG. 6 illustrates an example of a UI.

An operation screen 505 is a touch-panel operation screen. For example, a screen illustrated in FIG. 6 is displayed. On the screen, there are many touch-panel buttons (UIs) for inputting various setting values. A start key 506 is a UI for starting a job such as reading of a document. A clear key 507 is a UI for clearing a setting value. Each section of the operation unit 501 has been described.

Referring to FIG. 6, contents displayed on the operation unit 501 are described. FIG. 6 illustrates an example (operation screen 505) of a UI. A tag 602 displayed in the upper part of the operation screen 505 is a UI for selecting each function. In order from the left, there are a copy function, a transmission function, a box function, and a remote scanner function.

The transmission function enables facsimile transmission, electronic (E) mail transmission, or transmission to a file server. The box function enables storage of image data read by the scanner unit 202 in the HD 440 of the MFP, and an operation or printing of the stored data. The remote scanner function enables capturing of a scanned image in the PC by an operation from the PC 205 via the network.

By selecting the tag of each function, the screen is changed to a screen allowing inputting of each detailed setting value. The illustrated screen is for inputting a setting value of the copy function.

A color selection button 603 is an example of a UI for selecting a color mode. By pressing this button, a pull-down menu is displayed, and desired one can be selected from items (color, monochrome, and auto) of the pull-down menu. FIG. 6 illustrates an "AUTO" selected state.

In addition, there are arranged a magnification designation button 604, a sheet selection button 605, a finish button 606 for designating finishing such as shift sorting or staple sorting, a two-sided button 607 for designating two-sided printing, and a bar 608 for designating a density. Further, there are arranged a button 609 for selecting a document type, and an application mode button 610 for setting other various application modes.

Figure 7:
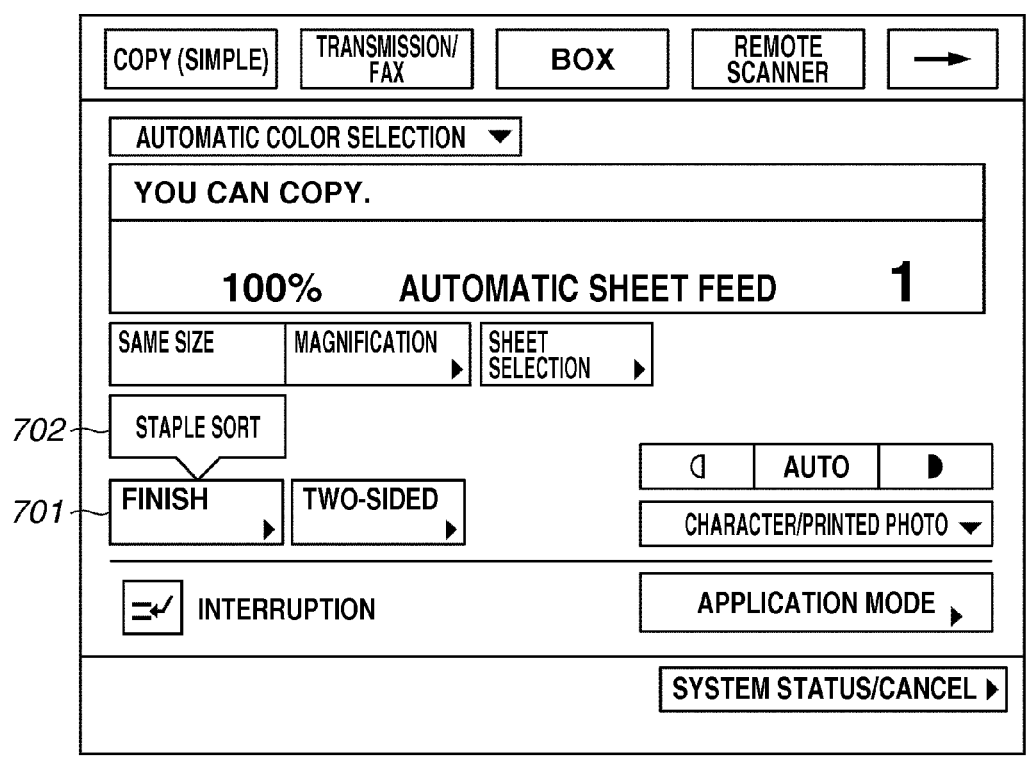
FIG. 7 illustrates an example of a UI.

FIG. 7 illustrates an example of a UI (screen when staple sorting is designated as finishing). When a finish button 701 is pressed, a screen for selecting a type of finishing (not illustrated) is displayed. On the displayed screen, sorting, shift sorting, or staple sorting can be selected. A selection item 702 indicates selection of the staple sorting.

Figure 8A:
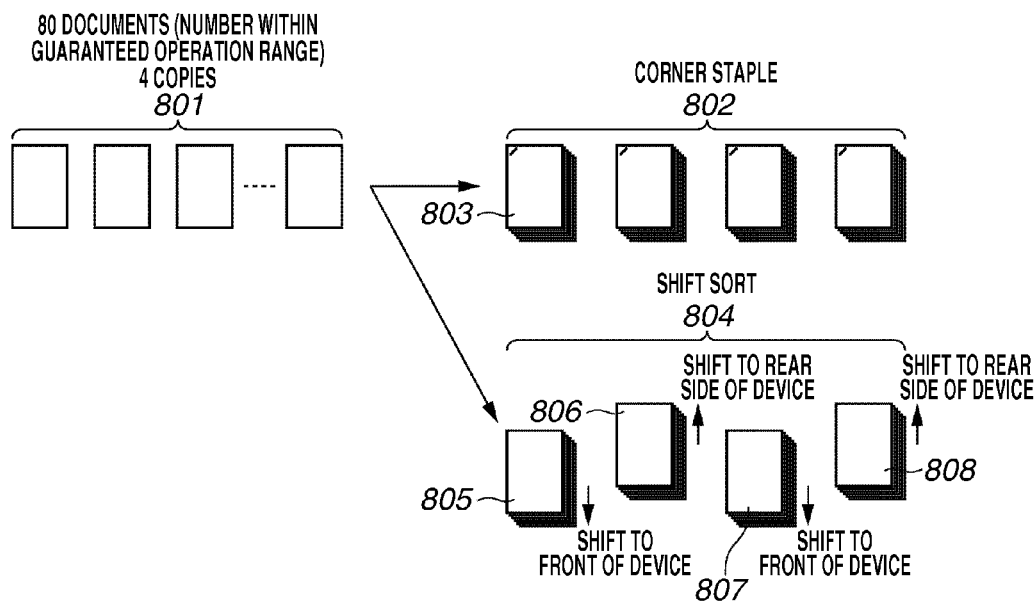
FIGS. 8A to 8C illustrate examples of operations of the MFP.
Figure 8B:
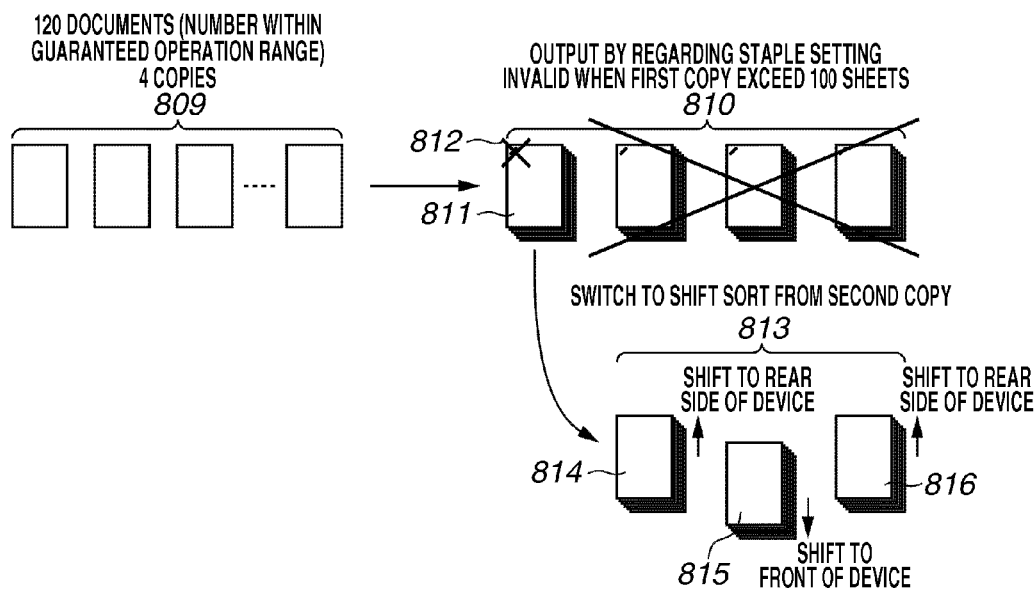
Figure 8C:
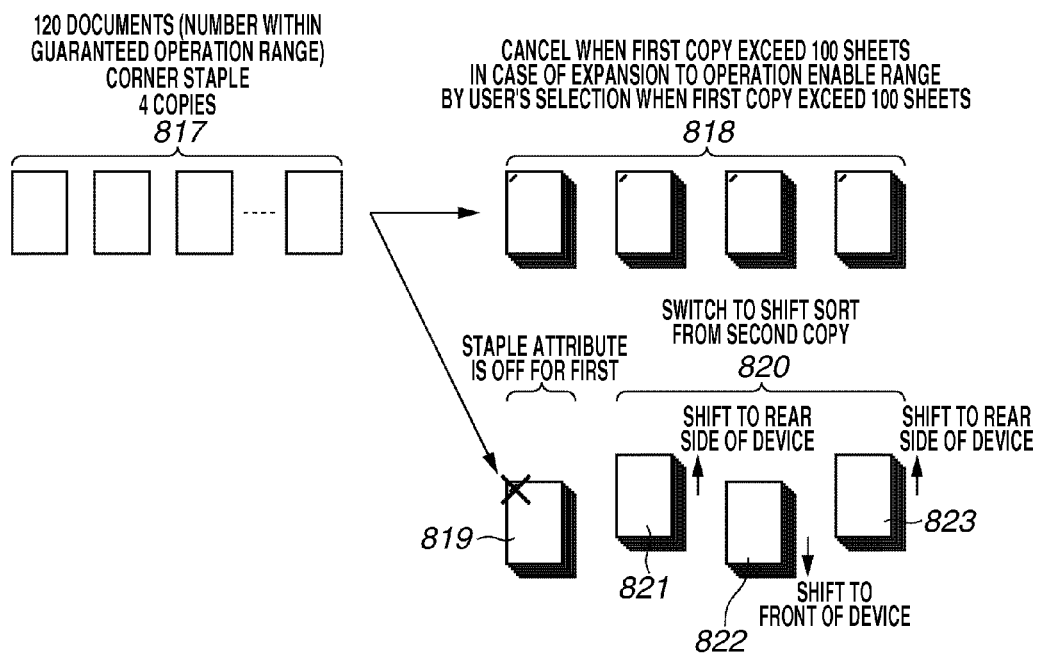

Next, referring to FIGS. 8A to 8C, control according to the present exemplary embodiment is described. Each of FIGS. 8A to 8C illustrates an example (operation in copy function) of an operation in the MFP. The operation of the present exemplary embodiment is described in comparison with a conventional operation. It is assumed that in the post-processing apparatus 204, the number of sheets to be processed in a normal state (post-processing guaranteed number) is 100.

FIG. 8A illustrates a case where the number of documents 801 is 80, and the operation can be carried out in the normal state, in other words, without expanding the number from the post-processing guaranteed number to the post-processable number. The case (operation in the normal state) is described referring to FIG. 8A.

FIG. 8B illustrates a case where the number of documents 809 is 120 exceeding the post-processing guaranteed number, and thus stapling cannot be carried out in the normal state. The case (how the conventional operation is carried out) is described referring to FIG. 8B.

FIG. 8C illustrates a case where the number of documents 817 is similar to that of documents 809, namely 120, and the operation can be carried out by expanding the number from the post-processing guaranteed number to the post-processable number. The case (characteristic operation of the present exemplary embodiment) is described referring to FIG. 8C.

First, a corner staple output 802 illustrated in FIG. 8A is when the documents 801 (80 documents) are subjected to staple sort processing (one corner binding). In the case of the corner staple output 802, as indicated by a sheet bundle 803, the corners of output sheets are stapled and output.

In this case, no shift sort processing is instructed, and accordingly, shift sort processing is not carried out for each rear/front part of a discharge tray of the post-processing apparatus 204. The stapled sheet bundle 803 is discharged to the same position of the discharge tray of the post-processing apparatus 204. Since the number of outputs per set is 80, the operation can be carried out as a normal operation without expanding the number to the post-processable number.

A shift sort output 804 is when shift sort processing is carried out. In this case, no staple processing is instructed, and thus the corners of output sheets are not stapled.

Instead thereof, shift sort processing is instructed. Accordingly, a sheet bundle 805, which is a first output, is shifted to the front side of the discharge tray of the post-processing apparatus 204 seen from the user to be discharged to the discharge tray. Then, a second sheet bundle 806 is shifted to the rear side of the discharge tray of the post-processing apparatus 204 to be discharged.

A next sheet bundle 807 is discharged to the front side of the discharge tray of the post-processing apparatus 204, and a last sheet bundle 808 is discharged to the rear side of the discharge tray of the post-processing apparatus 204. By this operation, the four sheet bundles are subjected to shift sort processing to be output.

Next, referring to FIG. 8B, the case where the documents 809 (120 documents) are subjected to staple sort processing (one corner binding) is described. In the conventional operation, the number is not expanded to the post-processable number. Since the number of outputs is also 120 for the 120 documents 809, stapling designated as post-processing is invalidated.

First, the post-processing apparatus 204 operates while reading the documents 809 in the operation of a first output bundle 811, and thus exceeding of the post-processing guaranteed number (100) cannot be detected at the time of starting an output. Thus, the main controller unit 201 instructs stapling to the printer unit 203 and the post-processing apparatus 204.

However, at the post-processing apparatus 204, inhibition of stapling is detected when the number 100 is exceeded. For a first set, since the main controller unit 210 has instructed stapling, the printer unit 203 and the post-processing apparatus 204 invalidate the instruction of the stapling, and output a sheet bundle 812 without executing stapling as illustrated.

Then, for a second set and after, exceeding of the numbers to be output over the post-processing guarantee number, namely, 100, can be detected when the output is started. Thus, as illustrated in FIG. 8B, the instruction from the main controller unit 201 to the printer unit 203 can be switched from stapling to shift sort processing to carry out the operation (shift sort output 813).

A sheet bundle 814 is shifted to the rear side of the discharge tray of the post-processing apparatus 204 and output. A sheet bundle 815 is shifted to the front side of the discharge tray of the post-processing apparatus 204 and output. A sheet bundle 816 is shifted to the rear side of the discharge tray of the post-processing apparatus 204 and output.

Thus, in the conventional operation, even when stapling cannot be carried out as instructed by the user, by executing the shift sort processing instead, the processing to enable the user to recognize the division between the sets is carried out.

However, even when the division between the sets is recognized, what the user wants as an output is a stapled output. Thus, the output by the conventional operation is not satisfactory.

Thus, according to the present exemplary embodiment, the post-processing apparatus 204 is controlled to carry out the operation illustrated in FIG. 8C. For the documents 817, as in the case of the documents 809, the operation is for the number exceeding the post-processing guaranteed number. For the documents 817, 120 documents are instructed to be subjected to staple sort processing (one corner binding), and four sets are instructed to be copied.

When the post-processing guaranteed number, namely, 100, is exceeded, the post-processing apparatus 204 temporarily stops a job. When the job is stopped, the pop-up 101 illustrated in FIG. 1B is displayed on the operation panel.

When the operation is carried out by expanding the number to the post-processable number, the user presses the OK button 103. Then, the operation (corner staple output 818) illustrated in FIG. 8C is carried out. Since the number has been expanded for the sheet bundle exceeding the post-processing guaranteed number, the post-processing apparatus 204 executes corner staple processing for all the first to fourth sets. During the execution of the corner staple output 818, a message similar to that illustrated in FIG. 1A is displayed on the status line 105 of the operation panel, and display control is executed to notify the user of the expanded state to the post-processable number.

When the cancel button 102 is pressed from the temporarily stopped state of the job, the conventional operation (shift sort output 820) illustrated in FIG. 8C is carried out without expanding the number to the post-processable number. A first set is output to a discharge destination without being stapled because the printer unit 203 turns OFF stapling processing (attribute). A second set and after are switched to shift sort processing, and thus sheet bundles 821, 822, and 823 are shifted to the rear side and the front side of the discharge tray of the post-processing apparatus 204, and output to the discharge destination.

The operation has been described by taking the example of the copy function. The operation is similar even in the case of printing of electronic documents generated by an application of the PC 205.

This configuration enables reduction of maintenance costs of the service engineer. However, depending on service contracts, a mode where the service engineer executes adjustment may be necessary. Thus, according to the present exemplary embodiment, a configuration where control is executed to allow selection of the adjustment mode by the service engineer can be employed.

Figure 9:
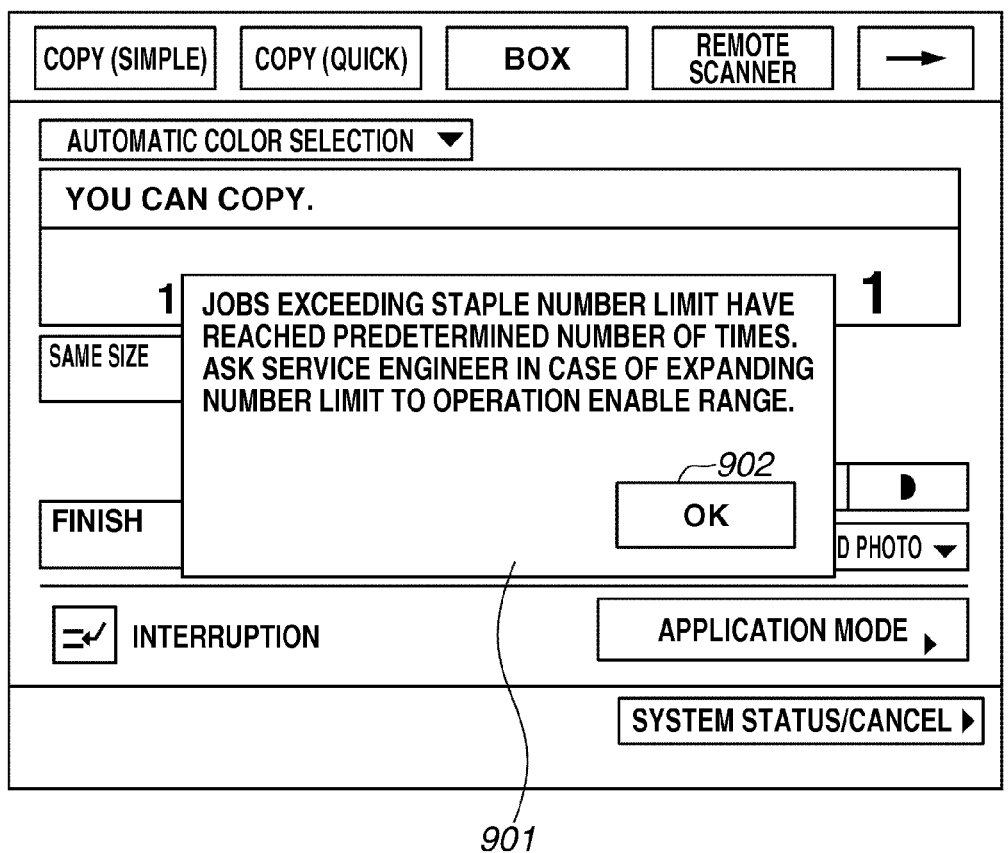
FIG. 9 illustrates an example of a UI.

Referring to FIG. 9, this configuration is described. FIG. 9 illustrates an example of a UI (screen on which the adjustment mode by the service engineer can be selected).

For example, a pop-up 901 illustrated in FIG. 9 is displayed in place of the pop-up 101 illustrated in FIGS. 1A and 1B. Different from the pop-up 101, in the pop-up 901, operation switching by the user cannot be selected. When wishing to expand the operation in post-processing, the user calls a service engineer according to a message for prompting a request to the service engineer.

Figure 10:
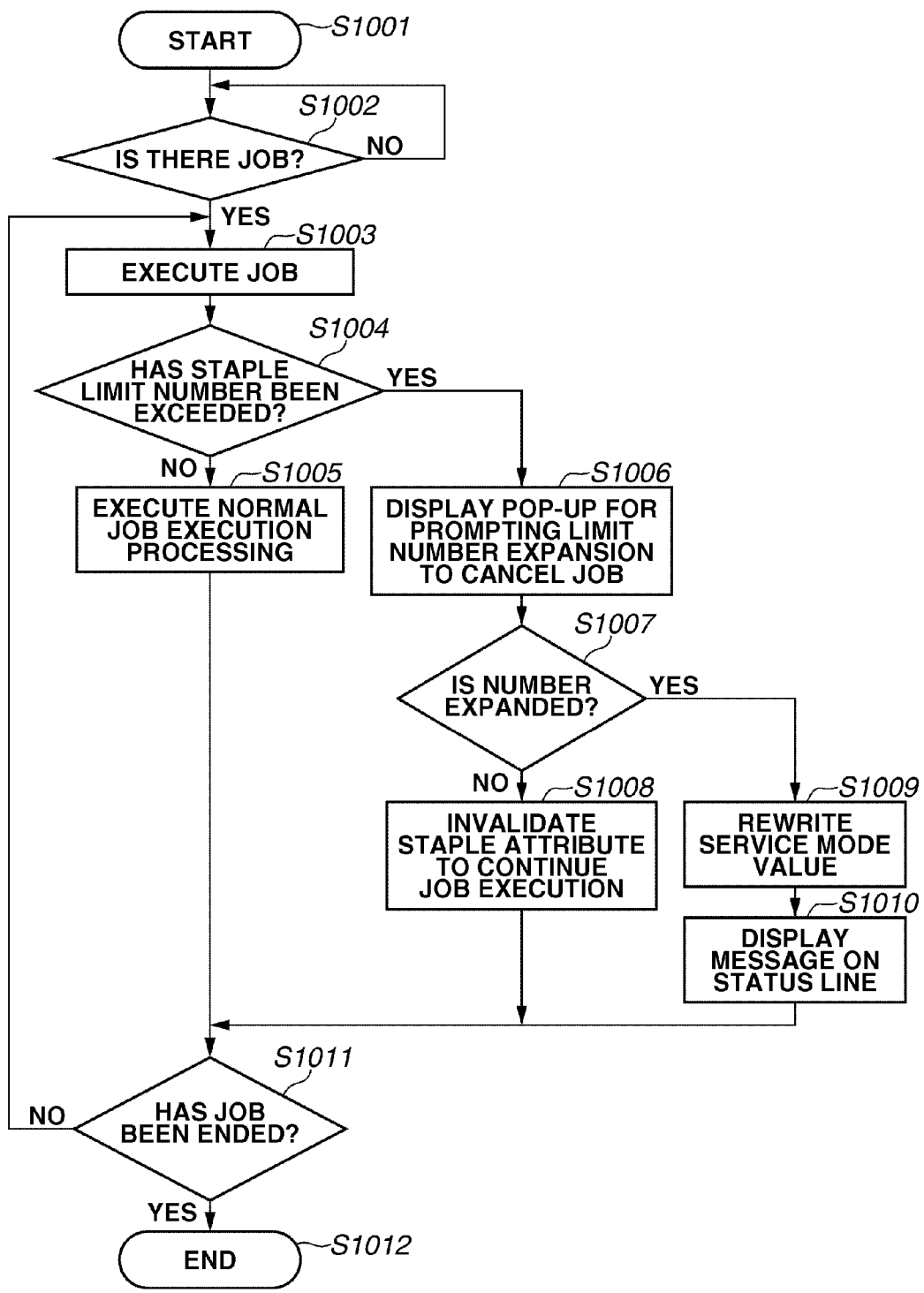
FIG. 10 is a flowchart illustrating an example of service processing.

Next, referring to FIG. 10, service processing for achieving services such as the copy function in the MFP is described. FIG. 10 is a flowchart illustrating an example of the service processing.

A program relating to the flowchart and data necessary for executing the program are stored in the ROM 404 and the HD 440, and the CPU 402 reads the program to the DRAM 406 to execute it. Executing the program can achieve the processing (function of the main controller unit 201) of the flowchart. All or some steps of the processing of the flowchart may be achieved by using dedicated hardware.

In step S1001, an operation of the start key 506 for starting copying is received and the processing is started. In step S1002, the main controller unit 201 checks whether there is any job. When there is no job (NO in step S1002), the main controller unit 201 loops the processing to its own state to wait for entry of a job. On the other hand, when the main controller unit 201 determines that there is a job (YES in step S1002), the processing proceeds to step S1003 to execute the job.

Then, in step S1004, the main controller unit 201 counts, during the execution of the job, for example, the number of sheets to be stapled for each set (for each processing) to check whether the number of sheets to be stapled exceeds the post-processing guaranteed number. In this case, when the main controller unit 201 determines that the post-processing guaranteed number is not exceeded (NO in step S1004), the processing proceeds to step S1005, and continues normal job execution. On the other hand, when the main controller unit 201 determines that the post-processing guaranteed number is exceeded (YES in step S1004), the processing proceeds to step S1006.

In step S1006, the main controller unit 201 displays a pop-up for prompting expansion to the post-processable number, and for canceling the job. For example, the pop-up 101 is displayed on the operation panel. Then, in step S1007, the main controller unit 201 determines whether to expand the number to the post-processable number. When the main controller unit 201 determines that the number is not expanded, in other words, the cancel button 102 has been pressed (NO in step S1007), the processing proceeds to step S1008. On the other hand, when the main controller unit 201 determines that the number is expanded (permitted), in other words, the OK button 103 has been pressed (YES in step S1007), the processing proceeds to step S1009.

In step S1008, the main controller unit 201 invalidates staple processing (attribute) to continue the job, and the processing proceeds to step S1011. For example, the main controller unit 201 controls the post-processing apparatus 204 to execute shift sort output 820 (output sheet bundle 819).

In step S1009, the main controller unit 201 rewrites a service mode value (setting value) stored in a storage unit such as the DRAM 406 or the HD 440 of the MFP. The value to be rewritten is a maximum value where the post-processing apparatus 204 is operable (example of expanded medium number information). For the value to be rewritten, in place of the maximum value, a value outside the operation guaranteed range and within the operable range can be employed as needed.

Then, in step S1010, the main controller unit 201 displays a message on the status line 105.

The configuration where the main controller unit 201 displays the message on the status line 105 is an example of notification. Then, the processing proceeds to step S1011.

In step S1011, the main controller unit 201 checks whether the job has been ended. When the main controller unit 201 determines that the job has been ended (YES in step S1011), in step S1012, the processing is ended. On the other hand, when the main controller unit 201 determines that the job has not been ended (NO in step S1011), the processing returns to step S1003 to be continued.

According to above-described configuration, the user can surely execute post-processing such as stapling without being aware of an upper limit number of sheets for each type of sheets to be used or each designation of an input job. Further, the user can recognize whether the number has been expanded to the post-processable number.

According to this configuration, no maintenance cost by the service engineer is necessary, nor any resetting work by the user is necessary, and outputs subjected to post-processing intended by the user can be acquired to the maximum limit.

The present exemplary embodiment has been described by taking the example of stapling (corner stapling) as the post-processing carried out by the post-processing apparatus 204. However, there are no restrictions on types of post-processing. For example, the present exemplary embodiment can similarly be applied to case binding, saddle stitch binding, and folding processing (double folding).

The first exemplary embodiment has been directed to the control for immediate expansion to the post-processable number when the post-processing guaranteed number is exceeded. When the number is expanded to the post-processable range, the post-processing is carried out as instructed by the user. However, as described above, the restrictions are imposed. For example, reduction of stapling accuracy, and an increase of the occurrence rate of jamming during the stapling occur.

Thus, the present exemplary embodiment is directed to control for suppressing a switching frequency to an expanded state. A presupposed control is based on the control of the first exemplary embodiment, and a main difference is described referring to FIG. 11.

Figure 11:
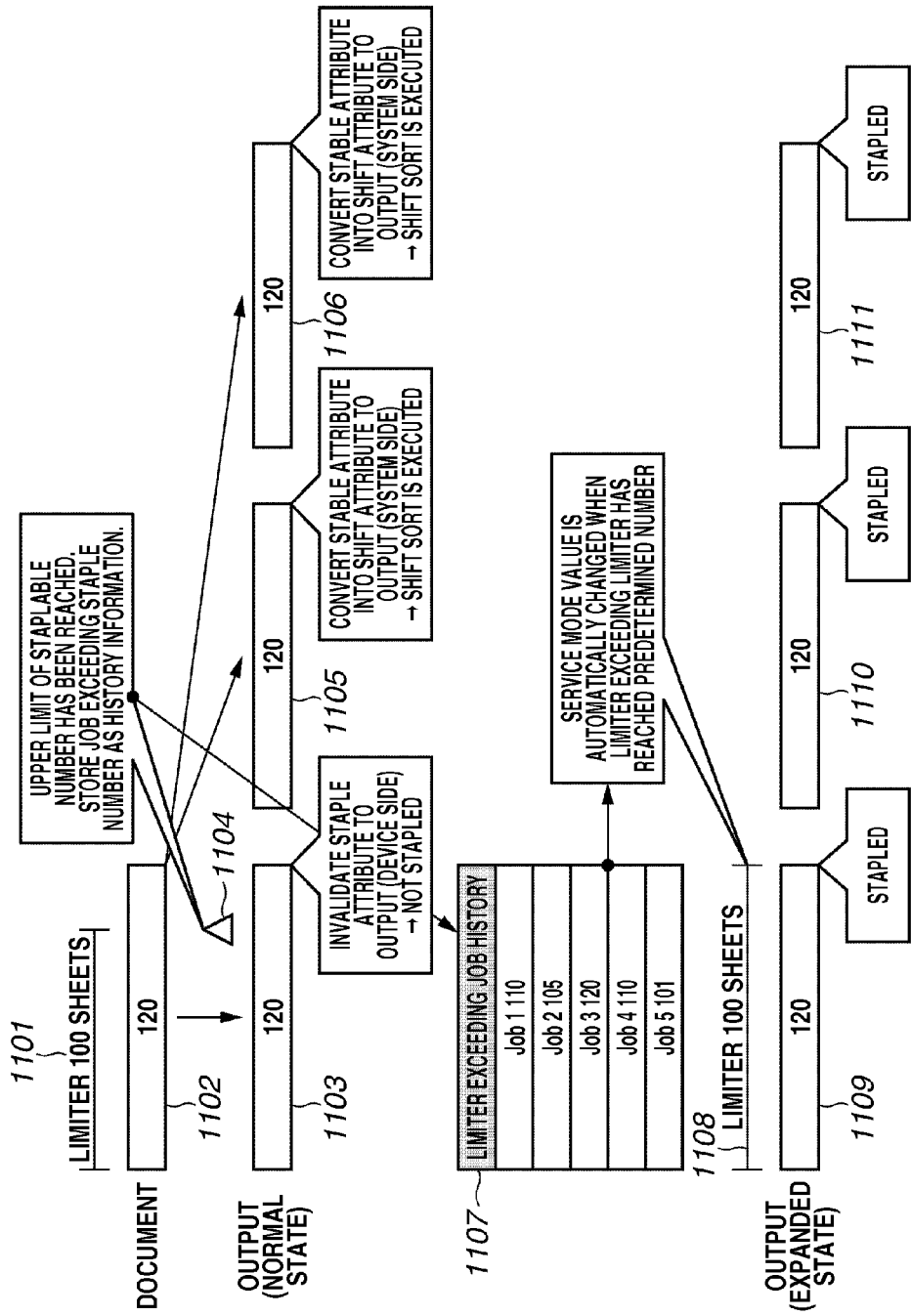
FIG. 11 illustrates an example of an operation of the MFP.

FIG. 11 illustrates an example of the operation in the MFP. It is assumed that a normal post-processing guaranteed number is 100. In the present exemplary embodiment, components similar to those of the first exemplary embodiment are denoted by similar reference numerals, and descriptions thereof are omitted as occasion demands.

A post-processing upper limit number 1101, which is an example of expanded medium number information, indicates the upper limit number of sheets to be post-processed by a post-processing apparatus 204. The post-processing upper limit number 1101 is stored in a post-processing number storage unit that is an example of a storage unit. The post-processing number storage unit initially stores 100 sheets that is a post-processing guaranteed number as the post-processing upper limit number 1101.

A document number 1102 indicates that a job of 120 documents has been input. The document can be a document by a copy function, or an electronic document generated by an application of a PC 205.

At the time when the post-processing upper limit number (100 in this example) in the 120 documents is reached, a number detection unit 1104 detects the reaching of the post-processing upper limit number (upper limit value). In this case, as described in the first exemplary embodiment referring to FIGS. 8A to 8C, a first sheet bundle 1103 is output by invalidating stapling (attribute). A second sheet bundle 1105 and a third sheet bundle 1106 are output by converting stapling (attribute) into shift sort processing (attribute).

In addition to this processing, the number detection unit 1104 executes control to store a job where the number of documents to be stapled exceeds the limit as job history information. The job history information is stored in a storage area 1107 that is an example of a storage unit. More specifically, an attribute such as a name of a job (example of identification information) and cumulative information (achievement value) indicating the output number (result) are associated to each other and stored in the storage area 1107.

In the present exemplary embodiment, five jobs, namely, job 1 to job 5, of which numbers of sheets are stored as jobs where the numbers of sheets exceed the limit. Each job has the number of sheets exceeding the post-processing upper limit number (100 in this example) within the range of 101 to 120. When the number of pieces of job history information (number of jobs) stored in the storage unit 1107 exceeds a predetermined value, for example, the post-processing upper limit number is rewritten with a maximum value of the job history information (achievement value) stored in the storage area 1107.

FIG. 11 illustrates an example of predetermined value of number of jobs=5. Since a job having the maximum number of sheets in the job history information is the job 3, the number is rewritten to a post-processing upper limit number 1108 (post-processing upper limit number is changed from 100 to 120). For jobs newly input thereafter, processing is carried out with the post-processing upper limit number 1108 (120). Accordingly, in the case of jobs up to 120, sheets are stapled and output as indicated by a sheet bundle 1109, a sheet bundle 1110, and a sheet bundle 1111.

Figure 12:
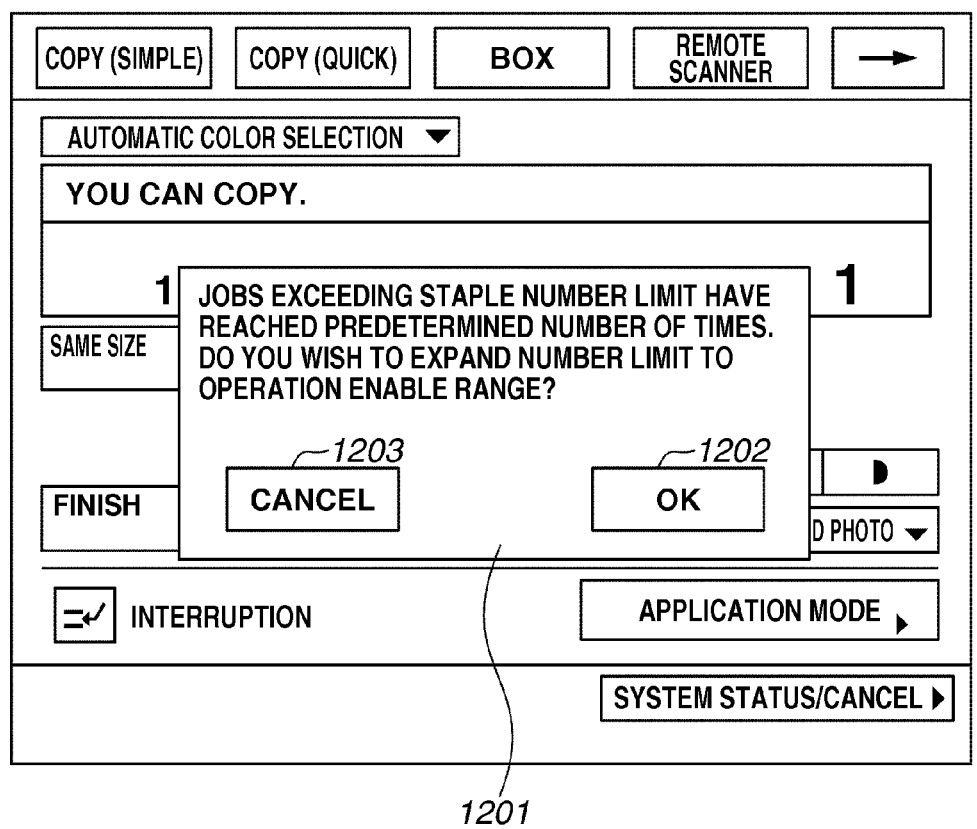
FIG. 12 illustrates an example of a UI.

Next, referring to FIG. 12, displaying on an operation panel when the number of pieces of job history information accumulated in the storage area 1107 exceeds a predetermined value is described. FIG. 12 illustrates an example of a UI (screen for receiving a user's selection operation as to whether to expand the post-processing upper limit number). When the number of pieces of job history information stored in the storage area 1107 reaches a predetermined value, a pop-up 1201 is displayed simultaneously with the end of the job.

The pop-up 1201 notifies a user of reaching of a job exceeding the stapling post-processing upper limit number to a predetermined number. The user presses an OK button 1202 when wishing to expand the post-processing upper limit number, and presses a cancel button 1203 when not wishing to expand the number. When the OK button 1202 is pressed, even when there is no job, a message indicating the expanded state of the post-processing upper limit number is displayed on a status line 105.

Figure 13:
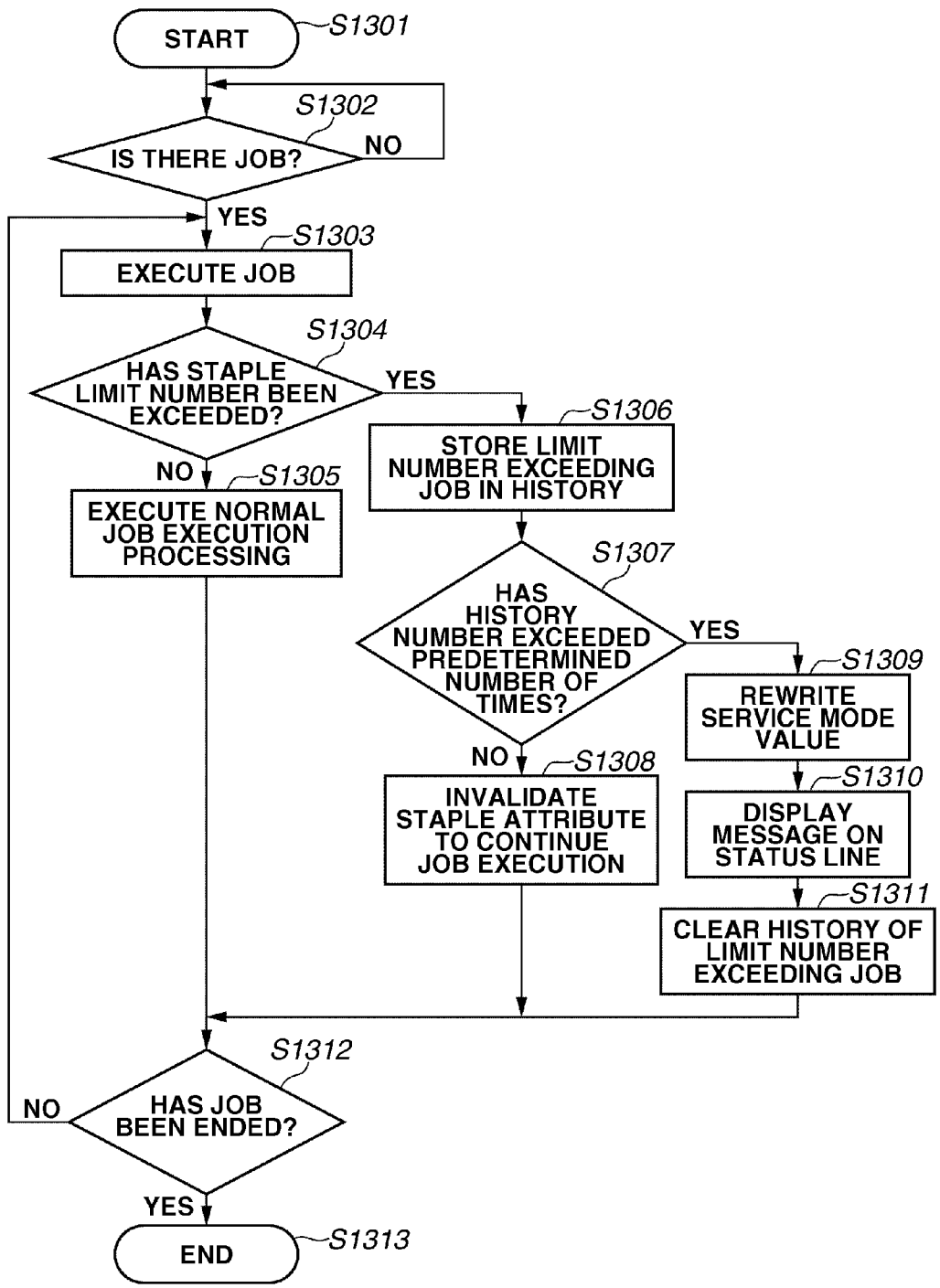
FIG. 13 is a flowchart illustrating an example of service processing.
Figure 14:
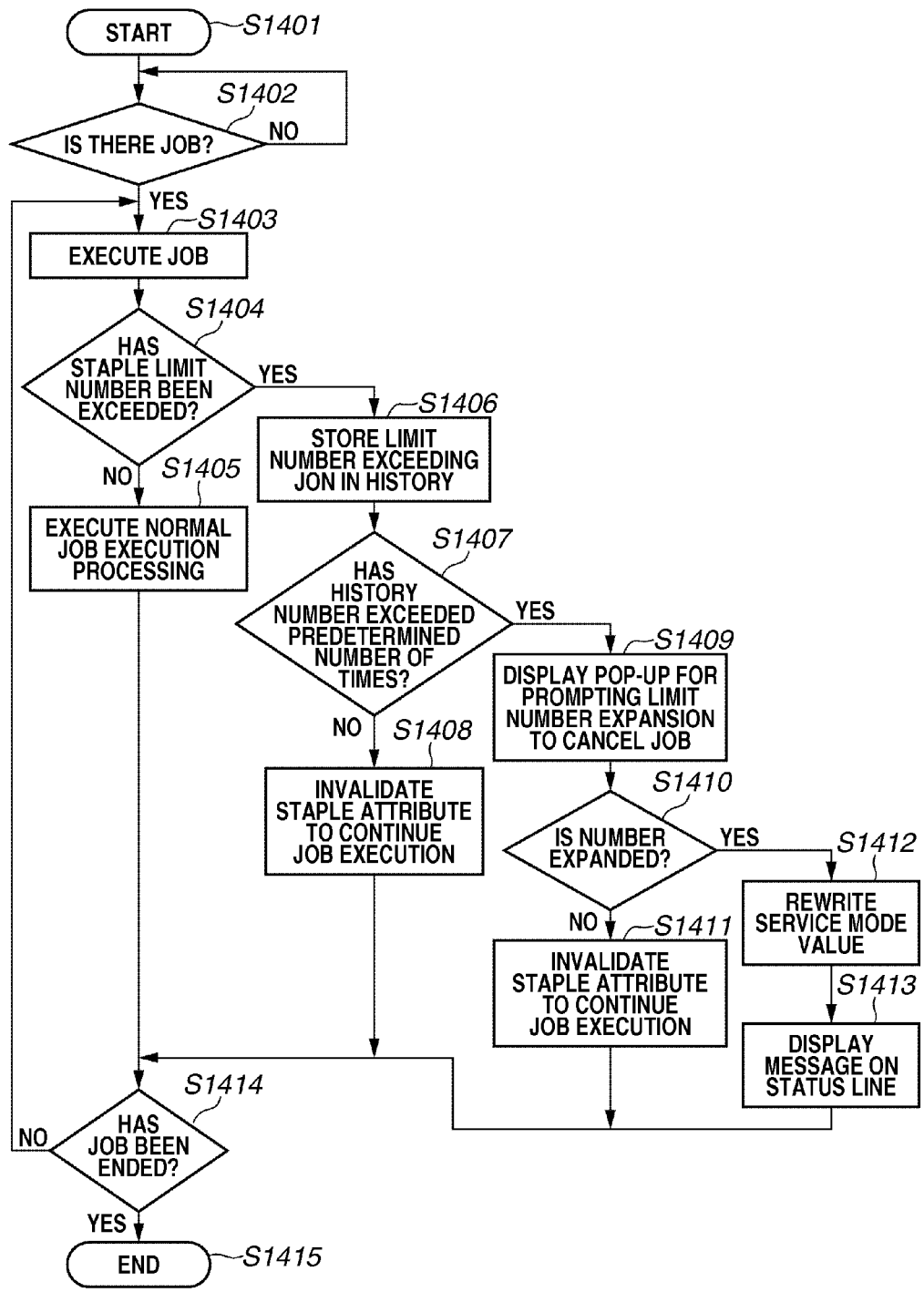
FIG. 14 is a flowchart illustrating an example of service processing.

Next, referring to flowcharts in FIGS. 13 and 14, service processing is described. FIG. 13 is a flowchart illustrating an example of service processing when the displaying of the screen for receiving the user's selection operation illustrated in FIG. 12 is omitted. FIG. 14 is a flowchart illustrating an example of service processing when the screen for receiving the user's selection operation illustrated in FIG. 12 is displayed.

In step S1301, an operation of a start key 506 for starting copying is received, and then the processing is started. In step S1302, the main controller unit 201 checks whether there is any job. When the main controller unit 201 determines there is no job (NO in step S1302), the main controller unit 201 loops to stand by. On the other hand, when the main controller unit 201 determines that there is a job (YES in step S1302), the processing proceeds to step S1303 and executes the job.

Then, in step S1304, the main controller unit 201 checks whether the post-processing upper limit number (stapling limit number) is exceeded. In this case, when the main controller unit 201 determines that the post-processing upper limit number is not exceeded (NO in step S1304), in step S1305, normal job execution is carried out. On the other hand, when the main controller unit 201 determines that the post-processing upper limit number is exceeded (YES in step S1304), the processing proceeds to step S1306. In step S1306, the main controller unit 201 stores a job exceeding the post-processing upper limit number as job history information.

Then, in step S1307, the main controller unit 201 checks whether the number of pieces of stored job history information (history number) exceeds a predetermined number (prescribed number). In this case, when the main controller unit 201 determines that the number is not exceeded (NO in step S1307), in step S1308, the job execution is continued by invalidating stapling processing (attribute), and then the processing proceeds to step S1312. On the other hand, when the main controller unit 201 determines that the number is exceeded (YES in step S1307), the processing proceeds to step S1309.

In step S1309, the main controller unit 201 rewrites a maximum value in the job history information stored in the storage area 1107 as the post-processing upper limit number (service mode value). In place of the maximum value, a value within the range of achievement values in the job history information may be employed as occasion demands.

Then, in step S1310, the main controller unit 201 displays a message indicating expansion of the post-processing upper limit number on the status line 105. In step S1311, the main controller unit 201 clears the job history information stored in the storage area 1107, and the processing proceeds to step S1312.

In step S1312, the main controller unit 201 checks whether the job has been ended. When the main controller unit 201 determines that the job has been ended (YES in step S1312), in step S1313, the processing is ended. On the other hand, when the main controller unit 201 determines that the job has not been ended (NO in step S1312), the processing returns to step S1303.

Next, FIG. 14 is described. In FIG. 13, the MFP is configured to automatically expand the post-processing upper limit number. However, FIG. 14 illustrates a configuration where whether to expand the post-processing upper limit number is determined according to a user's operation.

In step S1401, an operation of the start key 506 for starting copying is received and the processing is started. In step S1402, the main controller unit 201 checks whether there is any job. When the main controller unit 201 determines that there is no job (NO in step S1402), the main controller unit 201 loops the processing to stand by. On the other hand, when the main controller unit 201 determines that there is a job (YES in step S1402), the processing proceeds to step S1403 and executes the job.

Then, in step S1404, the main controller unit 201 checks whether the post-processing upper limit number (stapling limit number) is exceeded. In this case, when the main controller unit 201 determines that the post-processing upper limit number is not exceeded (NO in step S1404), in step S1405, normal job execution is carried out. On the other hand, when the main controller unit 201 determines that the post-processing upper limit number is exceeded (YES in step S1404), the processing proceeds to step S1406. In step S1406, the main controller unit 201 stores a job exceeding the post-processing upper limit number as job history information.

Then, in step S1407, the main controller unit 201 checks whether the number of pieces of stored job history information (history number) exceeds a predetermined number (prescribed number). In this case, when the main controller unit 201 determines that the number is not exceeded (NO in step S1407), in step S1408, the job execution is continued by invalidating stapling processing (attribute), and then the processing proceeds to step S1414. On the other hand, when the main controller unit 201 determines that the number is exceeded (YES in step S1407), the processing proceeds to step S1409.

In step S1409, the main controller unit 201 displays a pop-up for prompting expansion to the post-processable number. For example, a pop-up 1201 is displayed on the operation panel.

Then, in step S1410, the main controller unit 201 determines whether to expand the post-processing upper limit number. When the main controller unit 201 determines that the post-processing upper limit number is not expanded, in other words, the cancel button 102 has been pressed (NO in step S1410), in step S1411, the job history information of the job exceeding the limit is cleared, and the processing proceeds to step S1414. On the other hand, when the main controller unit 201 determines that the post-processing upper limit number is expanded, in other words, the OK button 103 has been pressed (YES in step S1410), the processing proceeds to step S1412.

In step S1412, the main controller unit 201 rewrites a maximum value in the job history information stored in the storage area 1107 as the post-processing upper limit number (service mode value). In place of the maximum value, a value within the range of achievement values in the job history information can be employed as occasion demands. Then, in step S1413, the main controller unit 201 displays a message on the status line 105 and the processing proceeds to step S1414.

In step S1414, the main controller unit 201 checks whether the job has been ended. When he main controller unit 201 determines that the job has been ended (YES in step S1414), in step S1415, the processing is ended. On the other hand, when the main controller unit 201 determines that the job has not been ended (NO in step S1414), the processing returns to step S1403.

Next, control to return the state to the normal state after the post-processing upper limit number has been changed (to the expanded state) by this control is described. In the first exemplary embodiment, it is assumed that the state is returned to the normal state at the time when the job is ended. However, in the present exemplary embodiment, there is no timing for returning the state to the normal state.

Thus, according to the present exemplary embodiment, as processing for returning the state to the normal state, a UI for clearing the expanded state is provided on the operation panel, and control is executed so that the user can return the expanded state to the normal state by operating the UI. According to this configuration, the MFP set in the expanded state can be maintained as it is (expanded state), or returned to an original state (the normal state) when necessary.

In the present exemplary embodiment, as the UI for notifying the user of the expanded state, the method for using the status line 105 of the operation panel has been described. However, this method is in no way limitative. For example, another method is described referring to FIG. 15.

Figure 15:
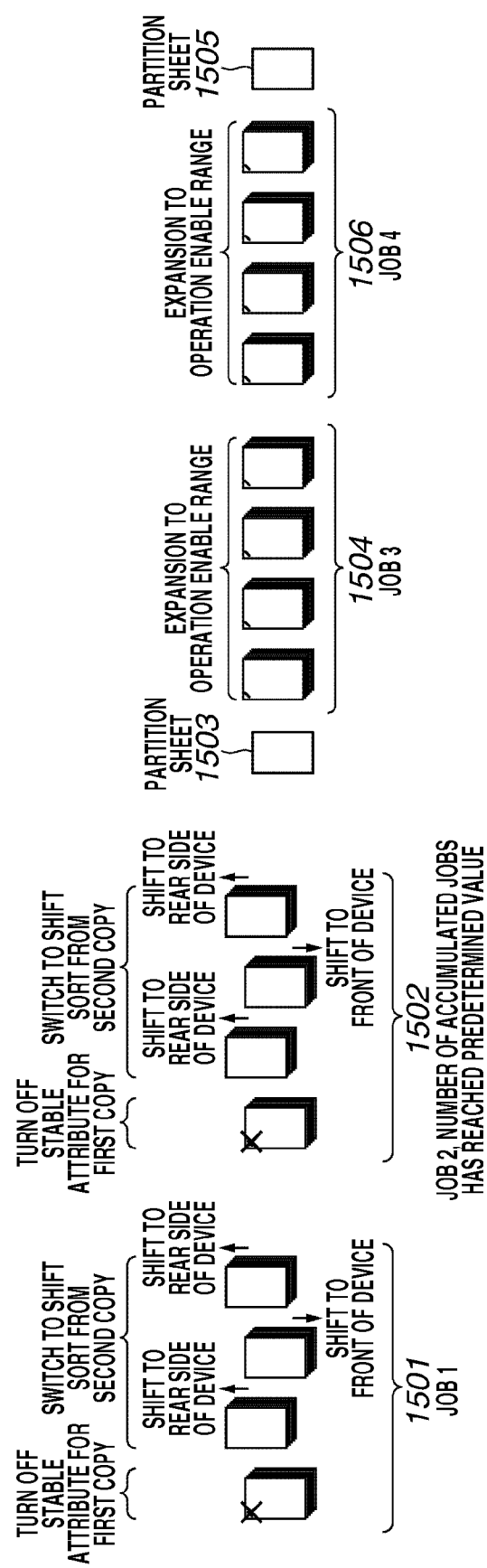
FIG. 15 illustrates an example of an operation of the MFP.

FIG. 15 illustrates an example of an operation in the MFP. In the POD market, when not the message on the operation panel of the MFP is checked but an output product is inspected, it may be beneficial for the user (operator) to be able to determine a state. Thus, in the present exemplary embodiment, a configuration where control for inserting partition paper is executed between the normal state and the expanded state, in a broad sense, when the post-processing upper limit number is switched, may be employed.

A job 1 (1501) and a job 2 (1502) illustrated in FIG. 15 indicate operations in the normal state. Both jobs exceed the post-processing upper limit value. However, in the case of the job 1 (1501), the number of pieces of stored job history information has not reached the predetermined value. In the case of the job 2 (1502), the number of pieces of stored job history information has reached the predetermined value.

A normal operation (executed by switching stapling to shift sort processing) is carried out until the job 2 (1502) where the number has reached the predetermined value. At the end of the job 2 (1502), one piece of partition paper 1503 is output. To facilitate user's identification, it is useful to set a sheet feeding state of the partition paper 1503 at a sheet feeding state where color sheets have been set.

Then, a job 3 (1504) and a job 4 (1505) continue to be operated in the expanded state of the post-processing upper limit number. Then, as described above, when clearing is executed by the UI for clearing the expanded state, the MFP executes control to output partition paper 1506 at this time.

By this control, among the output products from the job 1 to job 4 stacked on the discharge tray, the output products held between the partition paper 1503 and the partition paper 1506 can be recognized to have been output in the expanded state of the post-processing upper limit number at the time of inspection.

As a result, information can be provided for determining which part should carefully be checked during checking as to whether reduction of stapling accuracy has occurred. By executing the control to discharge one piece of partition paper, without canceling the job, the range of an operation in the expanded state can be identified by the partition paper during inspection of the output products.

The present invention is not limited to the aforementioned embodiments. For example, a configuration where control is executed to notify a remotely connected device management server (information processing apparatus such as server 206) of a flag indicating the expanded state or information such as a message displayed on the status line 105 can be employed. According to this configuration, the state of the post-processing apparatus 204 can be known even from a remote place via not only the display unit of the MFP but also a display apparatus of the communicably connected device management server, in other words, a network.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention. In an example, a computer-readable storage medium may store a program that causes a control apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-169371 filed Aug. 2, 2011, which is hereby incorporated by reference herein in its entirety.

What is claimed is:

1. A control apparatus to control a processing apparatus for processing recording media, the control apparatus comprising:
a counting unit configured to count a number of recording media processed by the processing apparatus for each processing;
a storage unit configured to store medium number information indicating a number of recording media processable altogether by the processing apparatus; and
a control unit configured to determine whether the number of recording media counted by the counting unit reaches the number indicated by the medium number information, and to change, in response to determining that the number of the recording media counted by the counting unit reaches the number indicated by the medium number information, the medium number information stored in the storage unit to expanded medium number information indicating a number of recording media that is larger than the number indicated by the stored medium number information and processable altogether by the processing apparatus,
wherein the storage unit is configured to store, in response to (i) a job being input, (ii) the control unit determining whether the number of the recording media counted by the counting unit reaches the number indicated by the medium number information in processing of the job at the processing apparatus, and (iii) determining that the number of the recording media counted by the counting unit reaches the number indicated by the medium number information, history information indicating the reaching in association with the job,
wherein the control unit determines, in response to determining that the number of the recording media counted by the counting unit reaches the number indicated by the medium number information, whether a number of pieces of history information stored in the storage unit has reached a prescribed number, and executes the change in response to determining that the number of pieces of history information has reached the prescribed number,
wherein the control unit determines whether the user has operated a user interface for restoring the expanded medium number information to the medium number information, and restores the expanded medium number information stored in the storage unit to the medium number information in response to determining that the user has operated the user interface to restoring the information from the expanded medium number information to the medium number information, and
wherein the control unit controls, in response to the change being executed and the expanded medium number information being restored to the medium number information, the processing apparatus to output a type of recording media that is different from the recording media.

2. The control apparatus according to claim 1, wherein, in response to determining that the number of the recording media counted by the counting unit reaches the number indicated by the medium number information, the control unit further determines whether a user has operated a user interface for receiving permission of the change, and executes the change in response to determining that the user has operated the user interface to permit the change.

3. The control apparatus according to claim 1, further comprising a notification unit configured to notify the change executed by the control unit.

4. The control apparatus according to claim 1, further comprising a transmission unit connected to an information processing apparatus to be communicable, and configured to transmit, to the information processing apparatus, information indicating that the change has been executed by the control unit.

5. A control method for a control apparatus to control a processing apparatus for processing recording media, the control method comprising:
counting a number of recording media processed by the processing apparatus for each processing;
storing medium number information indicating a number of recording media processable altogether by the processing apparatus; and
determining whether the counted number of recording media reaches the number indicated by the medium number information, and changing, in response to determining that the counted number of the recording media reaches the number indicated by the medium number information, the stored medium number information to expanded medium number information indicating a number of recording media that is larger than the number indicated by the stored medium number information and processable altogether by the processing apparatus,
wherein storing includes storing, in response to (i) a job being input, (ii) determining whether the counted number of the recording media reaches the number indicated by the medium number information in processing of the job at the processing apparatus, and (iii) determining that the counted number of the recording media reaches the number indicated by the medium number information, history information indicating the reaching in association with the job,
wherein determining includes determining, in response to determining that the counted number of the recording media reaches the number indicated by the medium number information, whether a number of stored pieces of history information has reached a prescribed number, and executing the change in response to determining that the number of pieces of history information has reached the prescribed number,
wherein determining includes determining whether the user has operated a user interface for restoring the expanded medium number information to the medium number information, and restoring the stored expanded medium number information to the medium number information in response to determining that the user has operated the user interface to restoring the information from the expanded medium number information to the medium number information, and
wherein determining includes controlling, in response to the change being executed and the expanded medium number information being restored to the medium number information, the processing apparatus to output a type of recording media that is different from the recording media.

6. The control method according to claim 5, wherein, in response to determining that the counted number of the recording media reaches the number indicated by the medium number information, determining includes determining whether a user has operated a user interface for receiving permission of the change, and executes the change in response to determining that the user has operated the user interface to permit the change.

7. The control method according to claim 5, further comprising notifying the executed change.

8. The control method according to claim 5, further comprising transmitting, to an information processing apparatus, information indicating that the change has been executed.

9. A non-transitory computer-readable storage medium storing a program to cause a control apparatus to perform a control method to control a processing apparatus for processing recording media, the control method comprising:

counting a number of recording media processed by the processing apparatus for each processing;

storing medium number information indicating a number of recording media processable altogether by the processing apparatus; and determining whether the counted number of recording media reaches the number indicated by the medium number information, and changing, in response to determining that the counted number of the recording media reaches the number indicated by the medium number information, the stored medium number information to expanded medium number information indicating a number of recording media that is larger than the number indicated by the stored medium number information and processable altogether by the processing apparatus, wherein storing includes storing, in response to (i) a job being input, (ii) determining whether the counted number of the recording media reaches the number indicated by the medium number information in processing of the job at the processing apparatus, and (iii) determining that the counted number of the recording media reaches the number indicated by the medium number information, history information indicating the reaching in association with the job, wherein determining includes determining, in response to determining that the counted number of the recording media reaches the number indicated by the medium number information, whether a number of stored pieces of history information has reached a prescribed number, and executing the change in response to determining that the number of pieces of history information has reached the prescribed number, wherein determining includes determining whether the user has operated a user interface for restoring the expanded medium number information to the medium number information, and restoring the stored expanded medium number information to the medium number information in response to determining that the user has operated the user interface to restoring the information from the expanded medium number information to the medium number information, and wherein determining includes controlling, in response to the change being executed and the expanded medium number information being restored to the medium number information, the processing apparatus to output a type of recording media that is different from the recording media.

10. The non-transitory computer-readable storage according to claim 9, wherein, in response to determining that the counted number of the recording media reaches the number indicated by the medium number information, determining includes determining whether a user has operated a user interface for receiving permission of the change, and executes the change in response to determining that the user has operated the user interface to permit the change.

11. The non-transitory computer-readable storage according to claim 9, the control method further comprising notifying the executed change.

12. The non-transitory computer-readable storage according to claim 9, the control method further comprising transmitting, to an information processing apparatus, information indicating that the change has been executed.

* * * * *